United States Patent
Schleser et al.

(10) Patent No.: US 9,065,376 B2
(45) Date of Patent: Jun. 23, 2015

(54) METHOD FOR CHECKING THE PLAUSIBILITY OF THE TORQUE OF AN ELECTRIC MACHINE AND MACHINE CONTROLLER FOR CONTROLLING AN ELECTRIC MACHINE AND FOR CARRYING OUT THE METHOD

(75) Inventors: Roland Schleser, Saarbruecken (DE); Daniel Raichle, Vaihingen (DE); Torsten Heidrich, Vaihingen/Enz (DE); Dragan Mikulec, Erlangen (DE); Gunther Goetting, Stuttgart (DE); Stephan Hanel, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 598 days.

(21) Appl. No.: 13/505,591

(22) PCT Filed: Sep. 16, 2010

(86) PCT No.: PCT/EP2010/063607
§ 371 (c)(1),
(2), (4) Date: Jul. 17, 2012

(87) PCT Pub. No.: WO2011/057838
PCT Pub. Date: May 19, 2011

(65) Prior Publication Data
US 2012/0278007 A1     Nov. 1, 2012

(30) Foreign Application Priority Data
Nov. 10, 2009   (DE) .......................... 10 2009 046 583

(51) Int. Cl.
*G01L 3/10*     (2006.01)
*H02P 29/02*    (2006.01)
*H02P 21/14*    (2006.01)

(52) U.S. Cl.
CPC .............. *H02P 29/021* (2013.01); *Y02T 10/643* (2013.01); *H02P 21/148* (2013.01)

(58) Field of Classification Search
CPC .... H02P 21/148; H02P 29/021; Y02T 10/643
USPC ........ 702/44; 38/432, 433, 434, 567, 400, 15; 180/404, 443, 65.285, 65.1
See application file for complete search history.

(56) References Cited

U.S. PATENT DOCUMENTS 4,388,577 A * 6/1983 Blaschke et al. ............. 318/717
4,423,367 A * 12/1983 Blaschke et al. ............. 318/803

(Continued)

FOREIGN PATENT DOCUMENTS

| DE | 10019152 | 12/2000 |
|----|----------|---------|
| DE | 102006005854 | 8/2007 |
| DE | 102008008536 | 8/2009 |
| EP | 1646525 | 4/2006 |
| JP | 62-31385 | 2/1987 |
| JP | 2000-177610 | 6/2000 |
| JP | 2003-324989 | 11/2003 |
| JP | 2007-116770 | 5/2007 |

(Continued)

OTHER PUBLICATIONS

International Search Report, PCT International Application No. PCT/EP2010/063607, dated Feb. 21, 2011.

*Primary Examiner* — Carol S Tsai
(74) *Attorney, Agent, or Firm* — Kenyon & Kenyon LLP

(57) ABSTRACT

A method for checking the plausibility of a torque of an electric machine, calculated on the basis of a machine model, in which a first value of an electromagnetic power of the electric machine is determined from the calculated torque and a rotational speed of the electric machine. Stator current components and stator phase voltage components are calculated from the stator currents and the stator phase voltages with respect to a reference system, which is fixed in relation to the stator. A second value of the electromagnetic power of the electric machine is determined from the stator current components and the stator phase voltage components. If a deviation of the first value of the electromagnetic power of the electric machine from the second value exceeds a predefined power threshold value, the torque of the electric machine, calculated on the basis of the machine model, is classified as implausible.

15 Claims, 1 Drawing Sheet

(56) References Cited

U.S. PATENT DOCUMENTS

| | | | | |
|---|---|---|---|---|
| 4,454,461 | A * | 6/1984 | Blaschke et al. | 318/717 |
| 6,646,394 | B2 * | 11/2003 | Minagawa et al. | 318/151 |
| 6,803,736 | B1 | 10/2004 | Hommel et al. | |
| 7,378,814 | B2 * | 5/2008 | Gaetani et al. | 318/717 |
| 7,688,012 | B2 * | 3/2010 | Blind et al. | 318/432 |
| 2009/0160379 | A1 | 6/2009 | Doerr et al. | |
| 2009/0160486 | A1 * | 6/2009 | Lee | 326/82 |
| 2011/0155486 | A1 * | 6/2011 | Iwaki et al. | 180/65.1 |

FOREIGN PATENT DOCUMENTS

| | | |
|---|---|---|
| JP | 2008-109846 | 5/2008 |
| JP | 2008-284892 | 11/2008 |
| JP | 2009-61164 | 3/2009 |
| JP | 2009-207315 | 9/2009 |
| JP | 2009-232530 | 10/2009 |
| WO | WO 2005/014329 | 2/2005 |
| WO | WO 2007025839 | 3/2007 |

* cited by examiner

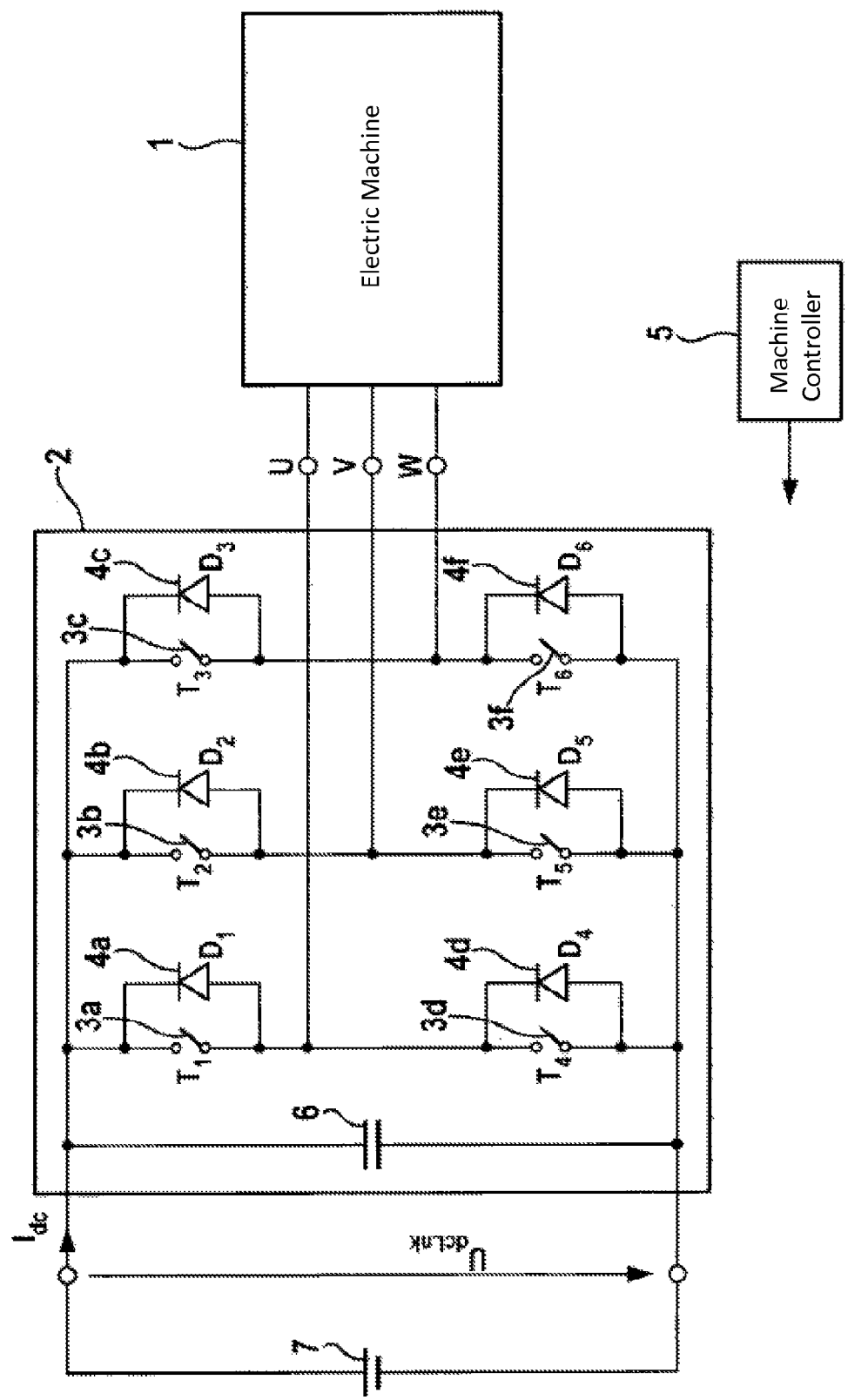

METHOD FOR CHECKING THE PLAUSIBILITY OF THE TORQUE OF AN ELECTRIC MACHINE AND MACHINE CONTROLLER FOR CONTROLLING AN ELECTRIC MACHINE AND FOR CARRYING OUT THE METHOD

FIELD OF THE INVENTION

The present invention relates to a method for checking the plausibility of a torque, calculated on the basis of a machine model, of an electric machine and a machine controller for controlling an electric machine and for carrying out the method.

BACKGROUND INFORMATION

Electric machines in the form of polyphase machines operated in conjunction with inverters are usually used to drive hybrid vehicles or electric vehicles. The electric machines are operated optionally in motor mode or in generator mode. In motor mode, the electric machine generates a driving torque which supports an internal combustion engine when used in a hybrid vehicle, for example, during an acceleration phase. In generator mode, the electric machine generates electrical energy, which is stored in an energy storage such as a battery or a Super-Cap, for example. The mode and performance of the electric machine are adjusted via the inverter with the aid of a control unit—often referred to as a machine controller.

Conventionally, continuous torque monitoring is carried out to discover malfunctions in a machine controller of an electric machine. This is used in particular to protect vehicle occupants and external traffic participants. An excessive rise in torque and a resulting inadvertent acceleration or deceleration of the vehicle are to be prevented. The core of continuous torque monitoring is the comparison of an actual torque supplied by the electric machine with an allowed torque. In the normal case, the actual torque is lower than the allowed torque. If the actual torque exceeds the allowed torque, an error is present in the machine controller of the electric machine, and an error response, which results in a safe vehicle condition, is initiated.

In conventional vehicles, the torque of the electric machine is usually calculated on the basis of a mathematical machine model. Consequently, the object of torque monitoring is to check the plausibility of the electromagnetic torque calculated by a machine controller on the basis of a model.

PCT Application No. WO 2007/025839 A1 describes a method for controlling a vehicle drive unit having at least two individual engines, in which a total actual torque is continuously compared with an allowed total torque. The total actual torque is calculated from individual actual torque values of the at least two individual engines, and the allowed total torque is calculated from allowed individual torque values of the at least two individual engines. An error response is initiated when the comparison yields the result that the total actual torque is higher than the allowed total torque.

SUMMARY

In the method according to the present invention for checking the plausibility of a torque calculated on the basis of a mathematical machine model of an electric machine, a first value of an electromagnetic power of the electric machine is determined as a function of the calculated torque and a rotational speed of the electric machine. Furthermore, stator currents—frequently also referred to as phase currents—and stator phase voltages—frequently also referred to as stator voltages or phase voltages—are ascertained in the phases of the electric machine. Stator current components and stator phase voltage components are calculated from the stator currents and the stator phase voltages with respect to a reference system which is fixed in relation to the stator. Depending on the stator current components and the stator phase voltage components, a second value of the electromagnetic power of the electric machine is determined and is subsequently compared with the first value of the electromagnetic power of the electric machine. If this reveals that the second value of the electromagnetic power of the electric machine deviates from the first value of the electromagnetic power of the electric machine by more than a predefined threshold value, then the torque calculated on the basis of the machine model of the electric machine is classified as implausible and consequently a malfunction of the machine controller is detected. The electric machine may be converted to a safe operating state or may be shut down entirely as a result of the error detection.

The plausibility check of the electromagnetic torque calculated on the basis of the machine model is thus based generally on a power balance between a machine model-based ascertained power (first value of the electromagnetic power) and a sensor-based ascertained comparative power. The second value of the electromagnetic power, which is used as the comparative power, is calculated on the basis of the stator currents and stator phase voltages of the electric machine, in particular a synchronous, asynchronous, reluctance or brushless dc current machine. A measurement of the link current and thus a corresponding current sensor system is not necessary to ascertain the comparative power, which reduces costs.

In the example method according to the present invention, the flux angle also does not enter into the calculation of the comparative power. This offers the additional possibility of a plausibility check of the flux angle with the aid of the calculated sensor-based ascertained comparative power.

According to one specific embodiment of the present invention, the machine model specifies a pole pair number, a direct-axis current, a cross current, an excitation flux and direct-axis and cross inductances of the electric machine from which the torque of the electric machine is calculated. The direct-axis and cross currents of the electric machine denote stator current components in the two orthogonal directions of a field-oriented reference system and represent stator current setpoint values as a function of the type and condition of the electric machine. The direct-axis and cross inductances refer to machine-specific stator inductances in the two directions of the field-oriented reference system.

According to one specific embodiment of the present invention, at least one of the stator currents is measured, and all stator currents which are not measured are model-based calculated, utilizing the symmetry properties of the stator currents.

If all stator currents are measured with the aid of current sensors, it is possible to detect an error in the current sensor system by analyzing the stator currents. This makes use of the fact that the total of the stator currents must be zero in an ideal system, so that an error may be detected if the total of the stator currents exceeds a predefined first stator current threshold value. Error detection for the current sensor system is implemented without any additional technical circuitry in this way.

According to another specific embodiment of the present invention, the stator phase voltages are ascertained by computer. Generally, an inverter upstream from the electric machine has a power output stage for each of the phases of the electric machine; this power output stage also includes power switching elements. These power switching elements are triggered by the machine controller usually via pulse width modulated control signals. The pulse duty factors for the individual phases of the electric machine may be ascertained directly from these control signals. With the aid of these pulse duty factors and a link voltage, which is metrologically ascertainable, stator phase voltages may be calculated. Measurement of the stator phase voltages, which is fundamentally also possible, may be omitted in this way.

In ascertaining the stator phase voltages, error voltages may also be taken into account, which are advantageously read out of an error voltage characteristics map as a function of the stator currents and the link voltage.

According to another specific embodiment of the present invention, in determining the second value of the electromagnetic power of the electric machine, a prevailing power loss of the electric machine is taken into account, this power loss advantageously being read out of a power loss characteristics map as a function of the stator currents and the rotational speed of the electric machine.

At low rotational speeds, it is advisable due to the associated low power to protect against the critical operating state of an inadvertent excessive rise in torque via an additional error path. In the basic rotational speed range of the electric machine, the absolute value of the maximally effective torque may be ascertained directly from the absolute value of the stator current. In error-free operation, the set setpoint torque corresponds at most to this maximum value. Deviations are possible, depending on the temperature of the electric machine and its rotor. Thus, the absolute value of a setpoint stator current may be ascertained as a function of the absolute value of the setpoint torque in the basic rotational speed range of the electric machine. According to one specific embodiment of the present invention, the absolute value of the setpoint stator current ascertained in this way is compared with the absolute value of an actual stator current, and the torque of the electric machine calculated on the basis of the machine model is then classified as being implausible when a deviation in the absolute value of the setpoint stator current from the absolute value of the actual stator current exceeds a predefined second stator current threshold value. The absolute value of the setpoint stator current is advantageously read out of a stator current characteristics map as a function of the setpoint torque.

Furthermore, depending on the second value of the electromagnetic power and of the rotational speed of the electric machine, it is possible to ascertain the sign of the effective torque. If the sign of the effective torque is not the same as the sign of the setpoint torque, then the torque calculated on the basis of the machine model may also be classified as implausible.

By utilizing the dependence of the torque absolute value on the absolute value of the stator current in the basic rotational speed range, an additional error path, which further increases the operational reliability of the electric machine, is easily created in this way.

A machine controller according to the present invention for controlling an electric machine and for carrying out the method according to the present invention includes an arrangement for determining a first value of an electromagnetic power of the electric machine from a torque calculated on the basis of a machine model and from a rotational speed of the electric machine, an arrangement for calculating stator current components and stator phase voltage components with respect to a reference system, which is fixed in relation to the stator, of stator currents and stator phase voltages, an arrangement for determining a second value of the electromagnetic power of the electric machine from the stator current components and the stator phase voltage components, an arrangement for comparing the first value of the electromagnetic power of the electric machine with the second value of the electromagnetic power of the electric machine and an arrangement for error detection on the basis of the deviation in the first value of the electromagnetic power of the electric machine from the second value of the electromagnetic power of the electric machine.

Additional features and advantages of specific embodiments of the present invention may be derived from the description below with reference to FIG. 1.

BRIEF DESCRIPTION OF THE DRAWING

FIG. 1 shows a schematic block diagram of an electric machine and an inverter having a motor controller in accordance with an example embodiment of the present invention.

DETAILED DESCRIPTION OF EXAMPLE EMBODIMENTS

FIG. 1 shows a schematic diagram of a three-phase electric machine 1, which may be designed, for example, as a synchronous, asynchronous, reluctance or brushless dc current machine connected to a pulse width modulation inverter 2. Pulse width modulation inverter 2 includes power circuit-breakers 3a through 3f, which are connected to individual phases U, V, W of electric machine 1 and switch phases U, V, W, either toward a high power supply voltage potential in the form of a link voltage $U_{dcLnk}$ or a low reference potential in the form of ground. Switches 3a through 3c connected to link voltage $U_{dcLnk}$ are also referred to as "high-side switches" and switches 3d through 3f connected to ground are referred to as "low-side switches." Pulse width modulation inverter 2 also includes multiple freewheeling diodes 4a through 4f, each being situated in parallel with one of switches 3a through 3f.

Pulse width modulation inverter 2 determines the power and operating mode of the electric machine and is triggered accordingly by a machine controller 5, which is shown only schematically in FIG. 1 and may also be integrated into the inverter. Electric machine 1 may optionally be operated in motor mode or in generator mode.

Pulse width modulation inverter 2 also includes a so-called link capacitor 6, which is used generally to stabilize the battery voltage. The vehicle electrical system having a battery 7 is switched in parallel with link capacitor 6.

In the exemplary embodiment shown here, electric machine 1 has a three phase design but may also have more or less than three phases. Electromagnetic torque $Trq_{EmMdl}$ of electric machine 1 is calculated in the machine controller on the basis of a mathematical machine model as a function of the machine-specific parameters pole pair number, direct-axis current, cross current, excitation flux and direct-axis and cross inductances of the electric machine using the following equation:

$$Trq_{EmMdl} = 3 \cdot p \cdot I_{sq} \cdot (\psi_{Exc} + I_{sd}(L_{sd} - L_{sq})) \quad (1)$$

where
$Trq_{EmMdl}$ electromagnetic torque of the machine (calculated from model data)
p pole pair number of the machine
$I_{sd}$ direct-axis current of the machine (stator phase voltage in the d direction of a field-oriented reference system)
$I_{sq}$ cross current of the machine (stator phase voltage in the q direction of a field-oriented reference system)

$\psi_{Exc}$ excitation flux of the machine $L_{sd}$, $L_{sq}$ stator inductances in the d and q directions of the field-oriented reference system Subscript "Mdl" here and below indicates that the corresponding variable is calculated exclusively on the basis of model data.

It is also possible to carry out the model-based calculation of the torque in a unit separate from machine controller 5 and to make available only the result of the calculation to machine controller 5.

A first value of electromagnetic power $Pwr_{EmMdl}$ of electric machine 1 is calculated according to the equation $$Pwr_{EmMdl} = Trq_{EmMdl} \cdot 2 \cdot \pi \cdot n \qquad (2)$$

where n is the rotational speed of electric machine 1, which is measurable with the aid of a rotational speed sensor, for example.

As an alternative, rotational speed n may also be calculated from an angle differential $((\alpha 2 - \alpha 1)/(t2-t1))$ of the two current phasors ($|I1| \cdot \exp(i\alpha 1)$ and $|I2| \cdot \exp(i\alpha 2)$) of electric machine 1 measured with a time lag to points in time t1 and t2. Measurement of rotational speed n of electric machine 1 may be omitted in this way. In addition, for a synchronous machine it is possible here to make use of the fact that it is capable of delivering a significant torque over entire electrical revolutions on the average only when triggered synchronously, so that the rotor is aligned according to the magnetic flux in the stator and thus according to the current phasor. This means that a synchronous machine is able to deliver torque over entire electrical revolutions only if the actual rotational speed of the electric machine is in synchronization with the angle differential.

However, if rotational speed n of electric machine 1 is measured nevertheless, the rotational speed calculated on the basis of the angle differential may be used for a plausibility check of the rotational speed signal of the rotational speed sensor and thus for error detection for the rotational speed sensor system.

Stator currents $I_{sU}$, $I_{sV}$ and $I_{sW}$ in phases U, V and W of electric machine 1 are measured via three current sensors (not shown in FIG. 1). If the neutral point of the electric machine is not grounded or if the machine windings are connected in delta, the total of the stator currents according to equation (3) must be zero:

$$I_{sU} + I_{sV} + I_{sW} = 0 \qquad (3)$$

This relationship may be used to detect an error in the current sensor system for measuring the stator currents. The absolute value of the total current is compared with a parameterizable first stator current threshold value $I_{sLim}$. An error in the current sensor system is detected if this threshold value is exceeded:

$$|I_{sU} + I_{sV} + I_{sW}| > I_{sLim} \Rightarrow \text{Fehler!} \qquad (4)$$

→Error!

As an alternative to measuring all the phase currents, it is also possible to measure just one phase current or at least only some of the phase currents and to calculate the other phase currents based on a model utilizing the symmetry properties. However, the plausibility check described and the error detection in the current sensor system associated with it are then impossible.

According to equation (5), stator current components $I_{sA}$ and $I_{sB}$ in the A and B directions of a reference system, which is fixed in relation to the stator—hereinafter referred to as the A/B system—are calculated from stator currents $I_{sU}$, $I_{sV}$ and $I_{sW}$.

$$\begin{pmatrix} I_{sA} \\ I_{sB} \end{pmatrix} = \frac{1}{\sqrt{2}} \cdot \begin{pmatrix} \frac{2}{3} & -\frac{1}{3} & -\frac{1}{3} \\ 0 & \frac{1}{\sqrt{3}} & -\frac{1}{\sqrt{3}} \end{pmatrix} \cdot \begin{pmatrix} I_{sU} \\ I_{sV} \\ I_{sW} \end{pmatrix} \qquad (5)$$

With the aid of a flux angle $\alpha_{Flx}$ which is either measured or calculated based on a model, two current components $I_{sd}$ and $I_{sq}$ in the d direction (longitudinal direction) and the q direction (transverse direction) of a field-oriented reference system—hereinafter referred to as the d/q system—may be calculated from stator current components $I_{sA}$ and $I_{sB}$, in the A/B system which is fixed in relation to the stator (cf. equation (6)). These stator current components $I_{sd}$ and $I_{sq}$ in the d/q system are used as feedback variables during control of electric machine 1.

$$\begin{pmatrix} I_{sd} \\ I_{sq} \end{pmatrix} = \begin{pmatrix} \cos\alpha_{Flx} & \sin\alpha_{Flx} \\ -\sin\alpha_{Flx} & \cos\alpha_{Flx} \end{pmatrix} \cdot \begin{pmatrix} I_{sA} \\ I_{sB} \end{pmatrix} \qquad (6)$$

Flux angle $\alpha_{Flx}$ represents the flux angle in the A/B system, which is fixed in relation to the stator.

Pulse duty factors $dyc_U$, $dyc_V$ and $dyc_W$ for individual phases U, V and W may be ascertained directly from the pulse width-modulated trigger signals of power circuit-breakers 3a through 3f. Effective stator phase voltages $U_{sU}$, $U_{sV}$ and $U_{sW}$ may be reconstructed with the aid of these pulse duty factors. A prevailing link voltage $U_{dcLnk}$ must therefore also be measured. According to an advantageous specific embodiment of the present invention, prevailing error voltages $U_{sUErr}$, $U_{sVErr}$ and $U_{sWErr}$ must also be taken into account, these voltages advantageously being read out of a characteristics map as a function of error voltages $I_{sU}$, $I_{sV}$ and $I_{sW}$ and link voltage $U_{dcLnk}$. Error voltages $U_{sUErr}$, $U_{sVErr}$ and $U_{sWErr}$ here are due to down times and nonideal switching behavior by power circuit-breakers 3a through 3f.

Stator phase voltages $U_{sU}$, $U_{sV}$ and $U_{sW}$ are thus obtained as follows:

$$\begin{pmatrix} U_{sU} \\ U_{sV} \\ U_{sW} \end{pmatrix} = c_{PWM} \cdot U_{dcLnk} \cdot \begin{pmatrix} dyc_U \\ dyc_V \\ dyc_W \end{pmatrix} + \begin{pmatrix} U_{sUErr} \\ U_{sVErr} \\ U_{sWErr} \end{pmatrix} \qquad (7)$$

where $C_{PWM}$=factor for converting link voltage $U_{dcLnk}$ into a maximum possible machine voltage and $$U_{sUErr} = KF(I_{sU}, U_{dcLnk}) \qquad (8.1)$$

$$U_{sVErr} = KF(I_{sV}, U_{dcLnk}) \qquad (8.2)$$

$$U_{sWErr} = KF(I_{sW}, U_{dcLnk}) \qquad (8.3)$$

where KF here and below means that the variable is stored in a characteristics map as a function of the variables given in parentheses.

Finally, both phase voltage components $U_{sA}$ and $U_{sB}$ of the stator in the A/B system, which is fixed in relation to the stator, are determined according to equation (9):

$$\begin{pmatrix} U_{sA} \\ U_{sB} \end{pmatrix} = \frac{1}{\sqrt{2}} \begin{pmatrix} \frac{2}{3} & -\frac{1}{3} & -\frac{1}{3} \\ 0 & \frac{1}{\sqrt{3}} & -\frac{1}{\sqrt{3}} \end{pmatrix} \cdot \begin{pmatrix} U_{sU} \\ U_{sV} \\ U_{sW} \end{pmatrix} \quad (9)$$

With the aid of stator current components $I_{sA}$ and $I_{sB}$ and stator phase voltage components $U_{sA}$ and $U_{sB}$ in the A/B system, which is fixed in relation to the stator, an electrical active power $Pwr_{ElMa}$ of electric machine 1 may be calculated according to equation (10):

$$Pwr_{ElMa} = 3 \cdot U_s \cdot I_s \cdot \cos \phi = 3 \cdot (U_{sA} \cdot I_{sA} + U_{sB} \cdot I_{sB}) \quad (10)$$

Power loss $Pwr_{ElMaLos}$ of the electric machine according to equation (11) is advantageously stored in a characteristics map as a function of the absolute value $I_s$ of the stator current and rotational speed n:

$$Pwr_{ElMaLos} = KF(I_s, n) \quad (11)$$

Absolute value $I_s$ of the stator current may be ascertained via the geometric sum of the two orthogonal stator phase voltage components $I_{sA}$ and $I_{sB}$ of the A/B system.

$$I_s = \sqrt{I_{sA}^2 + I_{sB}^2} \quad (12)$$

Second value $Pwr_{EmSens}$ of the electromagnetic power of electric machine 1 is thus obtained as follows:

$$Pwr_{EmSens} = Pwr_{ElMa} - Pwr_{ElMaLos} \quad (13)$$

Subscript "Sens" indicates that only sensor data but no model data are used to calculate the power.

The plausibility check of electromagnetic torque $Trq_{EmMdl}$ calculated with the aid of the machine model takes place via a power balance in which the power generating the electromagnetic torque is determined from the machine model according to equation (2) on the one hand and from the sensor data according to equation (13) on the other hand.

A power error may be calculated from the difference between these two values:

$$Pwr_{Err} = Pwr_{EmMdl} - Pwr_{EmSens} \quad (14)$$

where this power error is zero in the ideal case and assumes small values during normal operation. If the absolute value of power error $Pwr_{Err}$ calculated in this way exceeds a predefined parameterizable power threshold value $Pwr_{ErrLim}$, then the torque calculated on the basis of the machine model is classified as implausible and an error is detected accordingly:

$$|Pwr_{Err}| > Pwr_{ErrLim} \Rightarrow \text{Fehler!} \quad (15)$$

→Error!

As a result of this error detection, an equivalent reactance may then be initiated, ensuring reliable operation of electric machine 1.

At low rotational speeds, it is advisable due to the associated low powers to protect against the critical operating state of an inadvertent excessive rise in torque via an additional error path.

In the basic rotational speed range, the absolute value of a maximally effective torque may be ascertained directly from absolute value $I_s$ of the stator current. The absolute value of the stator current may in turn be ascertained via the geometric total of the two orthogonal stator current components in the A/B system, which is fixed in relation to the stator, according to equation (12). The dependence of the absolute value of the maximally effective torque on the absolute value of the stator current may advantageously be stored in a characteristic line and is characteristic for each type of machine. It holds here that:

$$|Trq_{Em}|_{Max} = Trw_{EmAbsMax} = KL(I_s) \quad (16)$$

In error-free operation, the set torque corresponds precisely to this maximal value. Each required setpoint torque $Trq_{EmDes}$ of corresponding stator current setpoint $I_{sDes}$ may be determined via the inverse function.

$$I_{sDes} = KL^{-1}(Trq_{EmDes}) \quad (17)$$

As long as a current error $I_{sErr}$ (cf. equation (18)) remains below a predefined parameterizable second stator current threshold value $I_{sErrLim}$, the absolute value of effective torque $Trq_{Em}$ is less than or equal to the absolute value of setpoint torque $Trq_{EmDes}$. Otherwise an error case is to be detected:

$$I_{sErr} = I_{sDes} - I_s \quad (18)$$

$$|I_{sErr}| \leq I_{sErrLim} \Rightarrow |Trq_{Em}| \leq |Trq_{EmDes}| \quad (19)$$

$$|I_{sErr}| > I_{sErrLim} \Rightarrow \text{Fehler!} \quad (20)$$

→Error!

Furthermore, the sign of effective torque $Trq_{Em}$ may also be checked. This is done as shown in equation (21) with the aid of the sign of electromagnetic power $Pwr_{EmSens}$ according to equation (13) and rotational speed n of electric machine 1:

$$\text{sgn}(Trq_{Em}) = \frac{\text{sgn}(Pwr_{EmSens})}{\text{sgn}(n)} \quad (21)$$

An error is also detected if the sign calculated in this way does not match the sign of setpoint torque $Trq_{EmDes}$:

$$\text{sgn}(Trq_{Em}) \neq \text{sgn}(Trq_{EmDes}) \Rightarrow \text{Fehler!} \quad (22)$$

→Error!

As shown by equations (19) and (22), the case when the absolute value of effective torque $Trq_{Em}$ is smaller than the absolute value of setpoint torque $Trq_{EmDes}$ does not automatically result in error detection via the additional error path described here. However, this less critical error case may also be covered via the power balance according to the present invention in the basic rotational speed range.

What is claimed is:

1. A method for checking plausibility of a calculated torque of an electric machine, the calculated torque calculated on the basis of a machine model, comprising:
    determining a first value of an electromagnetic power of the electric machine from the torque calculated on the basis of the machine model and a rotational speed of the electric machine;
    ascertaining stator currents and stator phase voltages in phases of the electric machine;
    calculating stator current components and stator phase voltage components from the stator currents and the stator phase voltages with respect to a reference system which is fixed in relation to the stator;
    determining a second value of the electromagnetic power of the electric machine from the stator current components and stator phase voltage components;
    comparing the first value of the electromagnetic power of the electric machine with the second value of the electromagnetic power of the electric machine; and
    classifying the torque of the electric machine, calculated on the basis of the machine model, as being implausible if a deviation of the first value of the electromagnetic power of the electric machine from the second value of the electromagnetic power of the electric machine exceeds a predefined power threshold value.

2. The method as recited in claim 1, wherein a pole pair number, a direct-axis current, a cross current, an excitation flux and a direct-axis inductance and a cross inductance of the electric machine are predefined by the machine model, the calculated torque of the electric machine being calculated therefrom.

3. The method as recited in claim 1, wherein the rotational speed of the electric machine is measured.

4. The method as recited in claim 3, wherein the rotational speed is ascertained from an angle differential of two current phasors measured with a time lag.

5. The method as recited in claim 1, wherein at least one of the stator currents is measured and all stator currents not measured are ascertained by computer.

6. The method as recited in claim 1, wherein all of the stator currents are measured, and an error is detected in the measurement of the stator currents if a total of the stator currents exceeds a predefined first stator current threshold value.

7. The method as recited in claim 1, wherein the stator phase voltages are ascertained by computer, including ascertaining pulse duty factors of individual phases of the electric machine, and a link voltage is measured and the stator phase voltages are calculated from the pulse duty factors and the link voltage.

8. The method as recited in claim 7, wherein prevailing error voltages are taken into account in ascertaining the stator phase voltages.

9. The method as recited in claim 8, wherein the prevailing error voltages are read out of an error voltage characteristics map as a function of the stator currents and the link voltage.

10. The method as recited in claim 8, wherein a prevailing power loss of the electric machine is taken into account in the determining of the second value of the electromagnetic power of the electric machine.

11. The method as recited in claim 10, wherein the prevailing power loss of the electrical machine is read out of a power loss characteristics map as a function of an absolute value of the stator current and a rotational speed.

12. The method as recited in claim 1, wherein an absolute value of a setpoint stator current is ascertained as a function of an absolute value of a setpoint torque in a basic rotational speed range of the electric machine, the absolute value of the setpoint stator current is compared with an absolute value of the stator current and the torque of the electric machine calculated on the basis of the machine model is classified as being implausible if a deviation in the absolute value of the setpoint stator current from the absolute value of the actual stator current exceeds a predefined second stator current threshold value.

13. The method as recited in claim 12, wherein the absolute value of the setpoint stator current is read out of a stator current characteristics map as a function of the setpoint torque.

14. The method as recited in claim 13, wherein a sign of an effective torque is ascertained as a function of the second value of the electromagnetic power of the electric machine and of the rotational speed, and the torque calculated on the basis of the machine model is classified as being implausible if a sign of the effective torque is not equal to a sign of the setpoint torque.

15. A machine controller for controlling an electric machine to check plausibility of a torque of an electric machine calculated on the basis of a machine model, comprising:
   a sensor; and
   processing circuitry communicatively coupled to the sensor for obtaining from the sensor a measured indication of a rotational speed of the electric machine, wherein the processing circuitry is configured to:
      determine a first value of an electromagnetic power of the electric machine from a torque calculated on the basis of a machine model, and from the rotational speed of the electric machine;
      calculate stator current components and stator phase voltage components with respect to a reference system, which is fixed in relation to the stator, of stator currents and stator phase voltages;
      determine a second value of the electromagnetic power of the electric machine from the stator current components and the stator phase voltage components;
      compare the first value of the electromagnetic power of the electric machine with the second value of the electromagnetic power of the electric machine; and
      detect errors on the basis of a deviation of the first value of the electromagnetic power of the electric machine from the second value of the electromagnetic power of the electric machine.

* * * * *